US012221901B1

(12) United States Patent
Thralls (10) Patent No.: US 12,221,901 B1
(45) Date of Patent: Feb. 11, 2025

(54) ELECTRIC GENERATOR WITH COMBINED ROTORS

(71) Applicant: Rolls-Royce North American Technologies, Inc., Indianapolis, IN (US)

(72) Inventor: Jordan Thralls, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 18/448,087

(22) Filed: Aug. 10, 2023

(51) Int. Cl.
*F01D 9/04* (2006.01)
*F02C 7/36* (2006.01)

(52) U.S. Cl.
CPC ............... *F01D 9/041* (2013.01); *F02C 7/36* (2013.01)

(58) Field of Classification Search
CPC .. F01D 9/041; F01D 15/10; F02C 7/32; F02C 7/36; F05D 2220/32; F05D 2220/76; F05D 2220/766; F05D 2220/768
See application file for complete search history.

(56) References Cited

U.S. PATENT DOCUMENTS

| | | | |
|---|---|---|---|
| 6,840,479 B1 | 1/2005 | Przygoda et al. | |
| 7,030,529 B2 | 4/2006 | Dommsch et al. | |
| 7,285,890 B2 | 10/2007 | Jones et al. | |
| 7,514,810 B2 | 4/2009 | Kern et al. | |
| 7,646,124 B2 | 1/2010 | Himmelmann et al. | |
| 10,539,076 B2 | 1/2020 | Niergarth et al. | |
| 11,130,456 B2 | 9/2021 | Klemen et al. | |
| 2004/0070211 A1* | 4/2004 | Franchet | F02C 7/32 290/31 |
| 2017/0335795 A1* | 11/2017 | Klemen | H02K 5/203 |
| 2022/0228505 A1 | 7/2022 | Simonetti et al. | |
| 2022/0298923 A1 | 9/2022 | Lighty | |

FOREIGN PATENT DOCUMENTS

EP 3246527 A1 11/2017

OTHER PUBLICATIONS

"Aircraft Gas Turbine Engine Lubrication System Components", 11 pp., Retrieved from the Internet on Aug. 21, 2023 from https://www.aircraftsystemstech.com.

(Continued)

*Primary Examiner* — Loren C Edwards
(74) *Attorney, Agent, or Firm* — Shumaker & Sieffert, P.A.

(57) ABSTRACT

Various aspects of the techniques are directed to a turbine engine that includes a core section comprising a compressor and a turbine that both rotate about a longitudinal axis of the turbine engine. The turbine engine also includes a fan comprising radially distributed blades, the fan connected to the core section and configured to be rotated by the turbine, and an electrical generator integrated into the core vane assembly and positioned in the core section aft of the fan and fore of the at least one compressor. The electrical generator comprises a stator, a turbine configured to extract work from a core fluid flow, the turbine configured to rotate about the longitudinal axis, and a combined rotor rotationally coupled to the fan, the combined rotor formed from a single component that incorporates a blade retainer for retaining at least one of the plurality of radially distributed blades.

16 Claims, 5 Drawing Sheets

(56) References Cited

OTHER PUBLICATIONS

Rolls-Royce PLC, "The Jet Engine", 1996, 292 pp., (Applicant points out, in accordance with MPEP 609.04(a), that the year of publication, 1996, is sufficiently earlier than the effective U.S. filing date, so that the particular month of publication is not an issue.).
Staunton et al., "PM Motor Parametric Design Analyses for a Hybrid Electric Vehicle Traction Drive Application—Interim Report", Oak Ridge National Laboratory, Jul. 2004, 110 pp.
U.S. Appl. No. 18/482,366, filed Oct. 6, 2023, naming inventors Maners.
U.S. Appl. No. 18/482,376, filed Oct. 6, 2023, naming inventors Maners.
ThePipingTalk, "Single shaft Gas turbine, Two-shaft Gas turbine & Multi-spool Gas turbine", The Piping talk, Dec. 2021, 6 pp., Retrieved from the Internet on Nov. 1, 2023 from URL: https://thepipingtalk.com/single-shaft-gas-turbine-two-shaft-gas-turbine-multi-spool-gas-turbine/.

\* cited by examiner

ELECTRIC GENERATOR WITH COMBINED ROTORS

GOVERNMENT RIGHTS

This invention was made with Government support under Grant Contract Number FA8650-19-F2078 awarded by Air Force Research Laboratory (AFRL). The Government has certain rights in the invention.

TECHNICAL FIELD

This disclosure relates to electrical power generation in turbine engines.

BACKGROUND

A turbine engine is a type of internal combustion engine that may drive an electric generator for converting mechanical power produced by the turbine engine to electrical power used by other components of a system. Some applications (e.g., due to size and weight restrictions) may require the electric generator to be located within the housing of the turbine engine. During operation, some internally-located electric generators may produce excess heat that may interfere with operations being performed by the electric generator and/or other collocated components of the turbine engine. In addition, performing maintenance or inspections of some internally-located electric generators may be difficult as other collocated components of the turbine engine obstruct access to the electric generator.

SUMMARY

Recently, demand for electrical power on vehicles (e.g., aircraft and others) has increased. For example, larger electronics and/or hybrid consideration has encouraged incorporation of new or additional electrical generator capability on turbine engines, including turbofans. Electrical generators may be positioned at various locations on turbine engines. As one example, an electrical generator may be positioned inside a tail cone of the engine. However, the tail cone may be exposed to hotter turbine temperatures, which may degrade generator performance. As another example, an electrical generator may be positioned on an outside of the turbine engine and be driven by a drive shaft off a compressor. However, positioning the generator on the outside may be limiting due to size constraints (e.g., on generator physical size).

An electrical generator may be positioned in a cavity behind a fan rotor of a turbine engine. For instance, the electrical generator rotor and stator may be concentric with a drive shaft of the fan, and may be placed in a space between the fan rotor and the first compressor stage. Such a location may provide various advantages (e.g., over tail cone or external generator positions). For instance, temperatures in such a space may be relatively low, which may improve generator performance. Furthermore, there may be a relatively large volume available, which may enable use of a larger generator (e.g., for a wider range of power extraction options). As another example, positioning the electrical generator in said cavity may enable integration of the electrical generator with existing engine components, such as a core vane. In this way, this disclosure may enable turbine engine to include relatively larger and/or relatively more efficient electrical generators.

However, there may be limits to the size of the electrical generator positioned in the cavity behind the fan rotor of the turbine engine that constrains generator rotor size. Given that a larger rotor (e.g., in terms of length and/or diameter) may improve electrical performance of the generator, the constraints may reduce generator performance.

In accordance with various aspects of the techniques described in this disclosure, the electrical generator may include a so-called combined rotor in which the rotor is combined with a blade retainer or a blade retainer and a seal. The combined rotor is "combined" in the sense that the rotor and blade retainer (and possibly the seal) are manufactured as a single component, thereby allowing the rotor to be extended in length while still maintaining the same size profile as an electrical generator having a rotor that is separate from blade retainer (and possibly the seal). The longer rotor of the combined rotor may improve electrical performance (given that a 1% increase in length may improve power output by 1%).

In one example, various aspects of the techniques are directed to a turbine engine comprising: a core section comprising at least one compressor and at least one turbine that both rotate about a longitudinal axis of the turbine engine; a fan comprising a plurality of radially distributed blades, the fan connected to the core section and configured to be rotated by the at least one turbine, rotation of the plurality of radially distributed blades providing thrust to a vehicle that includes the turbine engine; and an electrical generator integrated into the core vane assembly and positioned in the core section aft of the fan and fore of the at least one compressor, wherein the electrical generator comprises: a combined rotor rotationally coupled to the fan, the combined rotor configured to rotate about the longitudinal axis and formed from a single component that incorporates a blade retainer for retaining at least one of the plurality of radially distributed blades; and a stator configured to electromagnetically interact with the combined rotor.

In another example, various aspects of the techniques are directed to a method comprising: operating a turbine engine to provide thrust to a vehicle that includes the turbine engine, wherein the turbine engine comprises: a core section comprising at least one compressor and at least one turbine that both rotate about a longitudinal axis of the turbine engine; a fan comprising a plurality of radially distributed blades, the fan connected to the core section and configured to be rotated by the at least one turbine, rotation of the plurality of radially distributed blades providing the thrust to the vehicle that includes the turbine engine; and an electrical generator positioned in the core section aft of the fan and fore of the at least one compressor, wherein the electrical generator comprises: a combined rotor mechanically rotated via a mechanical connection to the at least one turbine, the combined rotor configured to rotate about the longitudinal axis and formed from a single component that incorporates a blade retainer for retaining at least one of the plurality of radially distributed blades; and a stator configured to electromagnetically interact with the combined rotor; and operating the electrical generator via the mechanical connection to the turbine engine to output power.

In another example, various aspects of the techniques are directed to an aircraft comprising: an airframe; and a turbine engine comprising: a core section comprising at least one compressor and at least one turbine that both rotate about a longitudinal axis of the turbine engine; a fan comprising a plurality of radially distributed blades, the fan connected to the core section and configured to be rotated by the at least one turbine, rotation of the plurality of radially distributed blades providing thrust to the airframe; and an electrical generator integrated into the core vane assembly and positioned in the core section aft of the fan and fore of the at least one compressor, wherein the electrical generator comprises: a combined rotor rotationally coupled to the fan, the combined rotor configured to rotate about the longitudinal axis and formed from a single component that incorporates a blade retainer for retaining at least one of the plurality of radially distributed blades; and a stator configured to electromagnetically interact with the combined rotor.

The details of one or more examples are set forth in the accompanying drawings and the description below. Other features, objects, and advantages will be apparent from the description and drawings, and from the claims.

DETAILED DESCRIPTION

Figure 1:
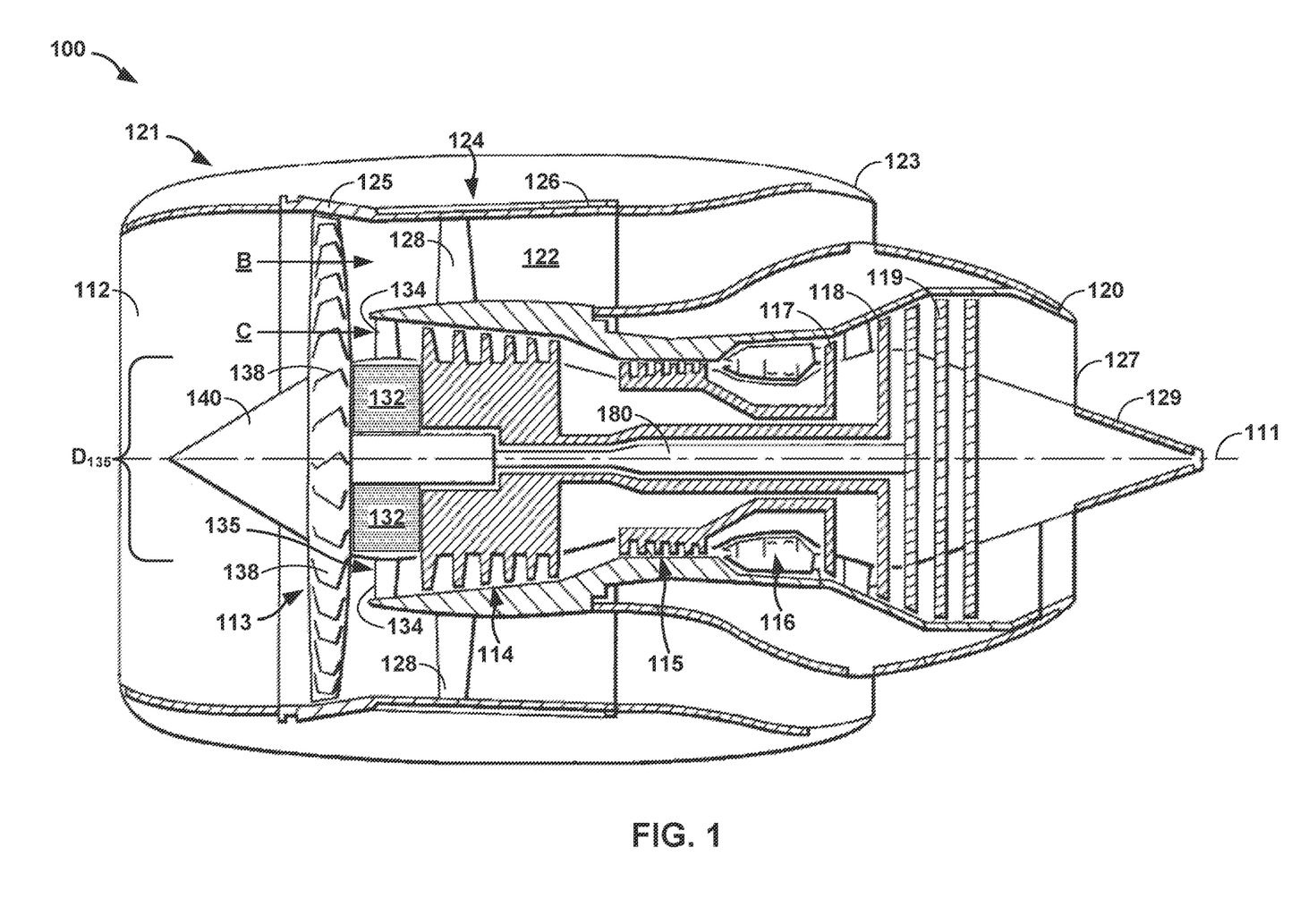
FIG. 1 is a conceptual diagram illustrating a cross-section of turbine engine 100 with an electric generator 132 for producing electrical power, in accordance with one or more aspects of this disclosure.

FIG. 1 is a conceptual diagram illustrating a cross-section of turbine engine 100 with an electric generator 132 for producing electrical power, in accordance with one or more techniques of this disclosure. Turbine engine 100 may be configured to convert one form of power to mechanical energy in the form of a rotating turbine. The mechanical energy produced by turbine engine 100 may be used in a variety of ways or for a variety of systems and applications (e.g., aircraft, locomotives, watercraft, power plants, electric generators, and any or all other systems and applications that rely on mechanical energy from a turbine engine to perform work). As illustrated in FIG. 1, turbine engine 100 may be a ducted fan gas-turbine engine, which may be used to propel an aircraft.

As shown in FIG. 1, turbine engine 100 has a principal and rotational axis 111. Turbine engine 100 may include, in axial flow series, an air intake 112, propulsive fan 113, intermediate pressure compressor 114, high-pressure compressor 115, combustion equipment 116, high-pressure turbine 117, intermediate pressure turbine 118, low-pressure turbine 119, and core exhaust nozzle 120. Turbine engine 100 may include nacelle 121, which may generally surround turbine engine 100 and defines air intake 112, a bypass duct 122, and an exhaust nozzle 123. Turbine engine 100 may include a center-plug 129, which is positioned within a core exhaust nozzle 120 to provide a form for the core gas flow C to expand against and to smooth its flow from the core engine. Centre-plug 129 may extend rearward of the core nozzle's exit plane 127.

Turbine engine 100 may operate such that air entering the intake 111 is accelerated by fan 113 to produce two air flows: a first airflow C (i.e., "core airflow") into intermediate pressure compressor 114 and a second airflow B (i.e., "bypass airflow") which passes through bypass duct 122 to provide propulsive thrust to an airframe (e.g., a body of an airplane). Turbine engine 100 may be a high-bypass engine (e.g., a ratio of B to C is greater than a threshold ratio) or a low-bypass engine (e.g., a ratio of B to C is less than the threshold ratio). Intermediate pressure compressor 114 may compress the airflow C directed into it before delivering that air to the high-pressure compressor 115 where further compression may occur.

The compressed air exhausted from the high-pressure compressor 115 may be directed into combustion equipment 116 where it is mixed with fuel and the mixture combusted. The resultant hot combustion products may then expand through, and thereby drive the high, intermediate and low-pressure turbines 117, 118, 119 before being exhausted through nozzle 120 (and may thereby provide additional propulsive thrust to the airframe). The high, intermediate and low-pressure turbines 117, 118, 119 may respectively drive the high and intermediate pressure compressors 115, 114 and the fan 113 by suitable interconnecting shafts. For instance, turbine engine 100 may include low-pressure shaft 180 that rotationally connects turbine 119 to fan 113.

While illustrated and described as a multi-shaft design, turbine engine 100 is no so limited. For instance, in some examples, turbine engine 100 may be a single shaft design (e.g., without separate HP/LP spools). Similarly, aspects of this disclosure are applicable to turbine engines of all ranges of thrust and sizes.

As noted above, fan 113 may be rotated using energy collected via turbine 119 (e.g., a power-turbine). As shown in FIG. 1, fan 113 may include a plurality of fan blades 138 connected to hub 140. Fan 113 may be circumferentially surrounded by a structural member in the form of a fan casing 124 (e.g., where turbine engine 100 is a ducted turbo-fan engine), which may be connected to an annular array of outlet guide vanes 128. Fan casing 124 may comprise a rigid containment casing 125 and attached rearwardly thereto is rear fan casing 126. As shown in FIG. 1, fan 113 (and/or other components of the engine core such as the high and intermediate pressure compressors 115, 114) may be connected to core vane assembly 135, including core vanes 134. Core vanes 134 may provide several functions. For instance, in addition to or in place of supporting fan 113, core vanes 134 may be shaped and arranged to straighten core airflow C before it reaches compressor 114. While illustrated in FIG. 1 as being a directly driven fan, in other examples fan 113 may be a geared turbofan. For instance, turbine engine 100 may include a gearbox mechanically between turbine 119 and fan 113. Core vane assembly 135 may have diameter $D_{135}$, which may approximately correspond to a diameter of at least a forward section of compressor 114.

One or more components of turbine engine 100 may be considered to form a core section. For instance, one or more of compressor 114, compressor 115, combustion equipment 116, and turbines 117, 118, 119 may form the core section of turbine engine 100. As noted above, core vanes 134 may be attached to the core section.

Turbine engine 100 may include electrical generator 132, which may be positioned in a cavity behind fan 113 (e.g., aft of fan hub 140). Electrical generator 132 may be any type of electrical generator and may generally include a rotor and a stator that rotate relative to each other. The rotor and the stator of electrical generator 132 may be concentric with a drive shaft of fan 113 (e.g., shaft connecting turbine 119 to fan 113), and may be placed in a space between fan 113 and compressor 114.

Figure 2A:
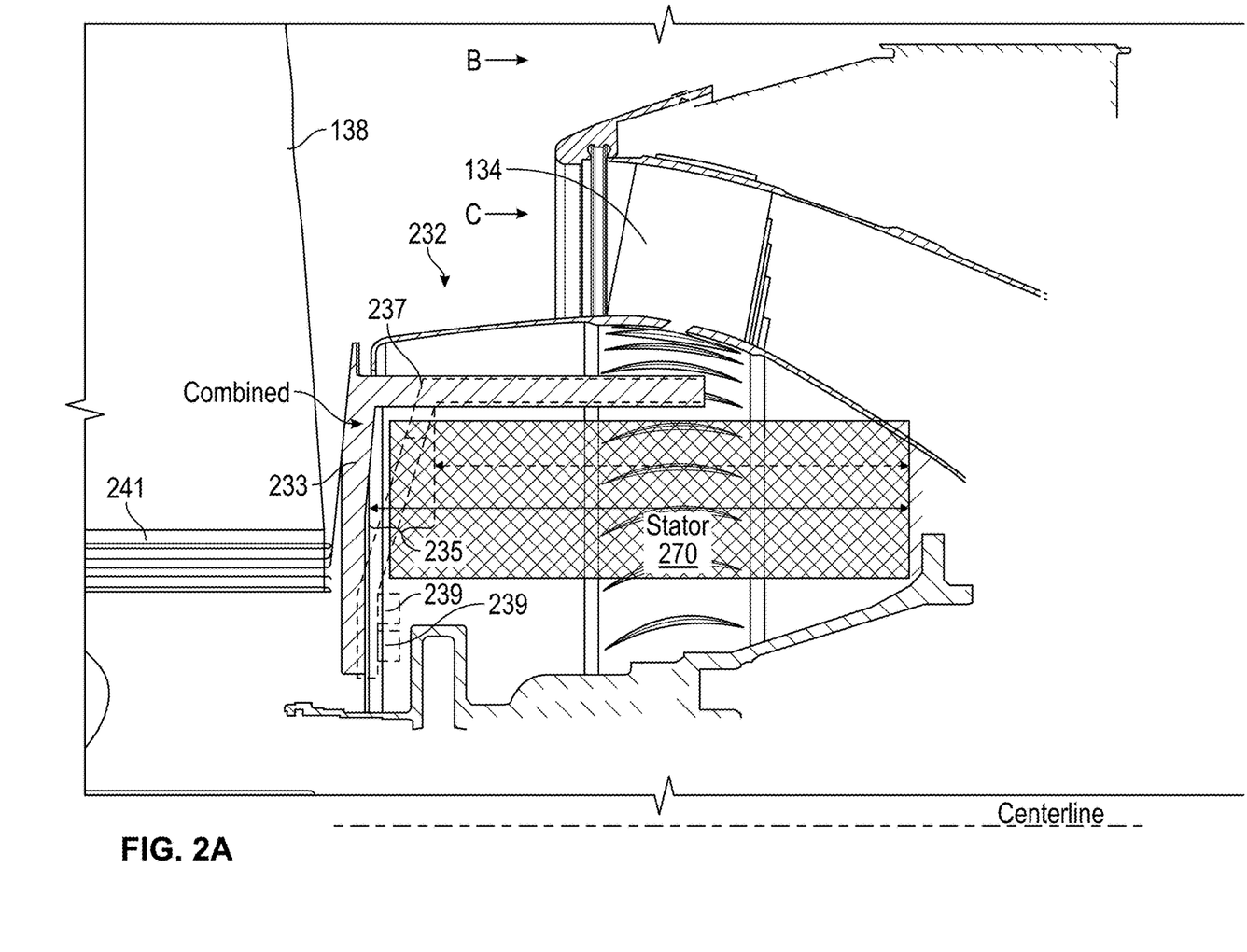
FIGS. 2A and 2B are conceptual diagrams illustrating, in more detail, the electrical generator of FIG. 1 that includes a combined rotor in accordance with various aspects of this disclosure.

Such a location may provide various advantages (e.g., compared to tail cone and/or external positions). For instance, temperatures in such a space may be relatively low, which may improve performance of electrical generator 132 (e.g., as performance of electrical generators may degrade when heated). Furthermore, there may be a relatively large volume available, which may enable use of a larger generator (e.g., for a wider range of power extraction options). As another example, positioning electrical generator 132 in said cavity may enable integration of electrical generator 132 with existing engine components, such as a core vane (e.g., core vane 135 of FIG. 2). In this way, this disclosure may enable turbine engine 100 to include relatively larger and/or relatively more efficient electrical generators.

As noted above, positioning electrical generator 132 in the cavity behind fan 113 may provide several benefits. For instance, the large volume available may allow for larger sized components of electrical generator 132. As one example, an outer diameter of electrical generator 132 may be a large percentage of a diameter of core vane assembly 135 (e.g., 70%, 80%, 90%, 95%, etc.)

Electrical generator 132 may be any type of electrical generator. Examples of electrical generator 132 include, but are not limited to, alternators, dynamos, permanent magnet generators, field wound generators, synchronous, asynchronous, brushed, brushless, etc. In general, electrical generator 132 may include a stator, and a rotor configured to rotate relative to the stator, where the stator is configured to electromagnetically interact with the rotor.

However, there may be limits to the size of electrical generator 132 positioned in the cavity behind the fan rotor of turbine engine 100 that constrains generator rotor size. Given that a larger rotor (e.g., in terms of length and/or diameter) may improve electrical performance of the generator, the constraints may reduce generator performance.

In accordance with various aspects of the techniques described in this disclosure, electrical generator 132 may include a so-called combined rotor in which the rotor is combined with a blade retainer or a blade retainer and a seal. The blade retainer may refer to a mechanical component configured to retain a plurality of radially distributed blades 138 (e.g., a back blade retainer that retains a back end of blades 138). The combined rotor is "combined" in the sense that the rotor and blade retainer (and possibly the seal) are manufactured as a single component, thereby allowing the combined rotor to be extended in length while still maintaining the same size profile as an electrical generator having a rotor that is a separate component from a distinct component forming the blade retainer (and possibly the seal). The longer rotor (e.g., along the longitudinal axis) of the combined rotor may improve electrical performance (given that a 1% increase in length may improve power output by 1%).

In operation, turbine engine 100 may include the core section described herein in more detail. The core section may include at least one compressor 114/115 and at least one turbine (e.g., turbines 117, 118, and/or 119) that both rotate about a longitudinal axis 111 of turbine engine 100. Turbine engine 100 may also include fan 113 connected to the core section and configured to be rotated by the at least one turbine 117, 118, and/or 119, rotation of fan 113 providing thrust to the vehicle that includes turbine engine 100 (such as airplane having an airframe). Turbine engine 100 also includes electrical generator 132 integrated into core vane assembly 135 and positioned in the core section aft of fan 113 and fore of the at least one compressor 114/115.

Although not shown in detail in the example of FIG. 1 (but shown in more detail with respect to the example of FIG. 2), electrical generator 132 may include a turbine configured to extract work from a core fluid flow, the turbine configured to rotate about longitudinal axis 111. Electrical generator 132 may also include a combined rotor mechanically rotated by the turbine of electrical generator 132, the combined rotor configured to rotate about longitudinal axis 111 and formed from a single component that incorporates a blade retainer for electrical generator 132. Electrical generator 132 may also include a stator configured to electromagnetically interact with the combined rotor. The configuration of electrical generator 132 is described in more detail with respect to the example of FIGS. 2A and 2B.

Figure 2B:
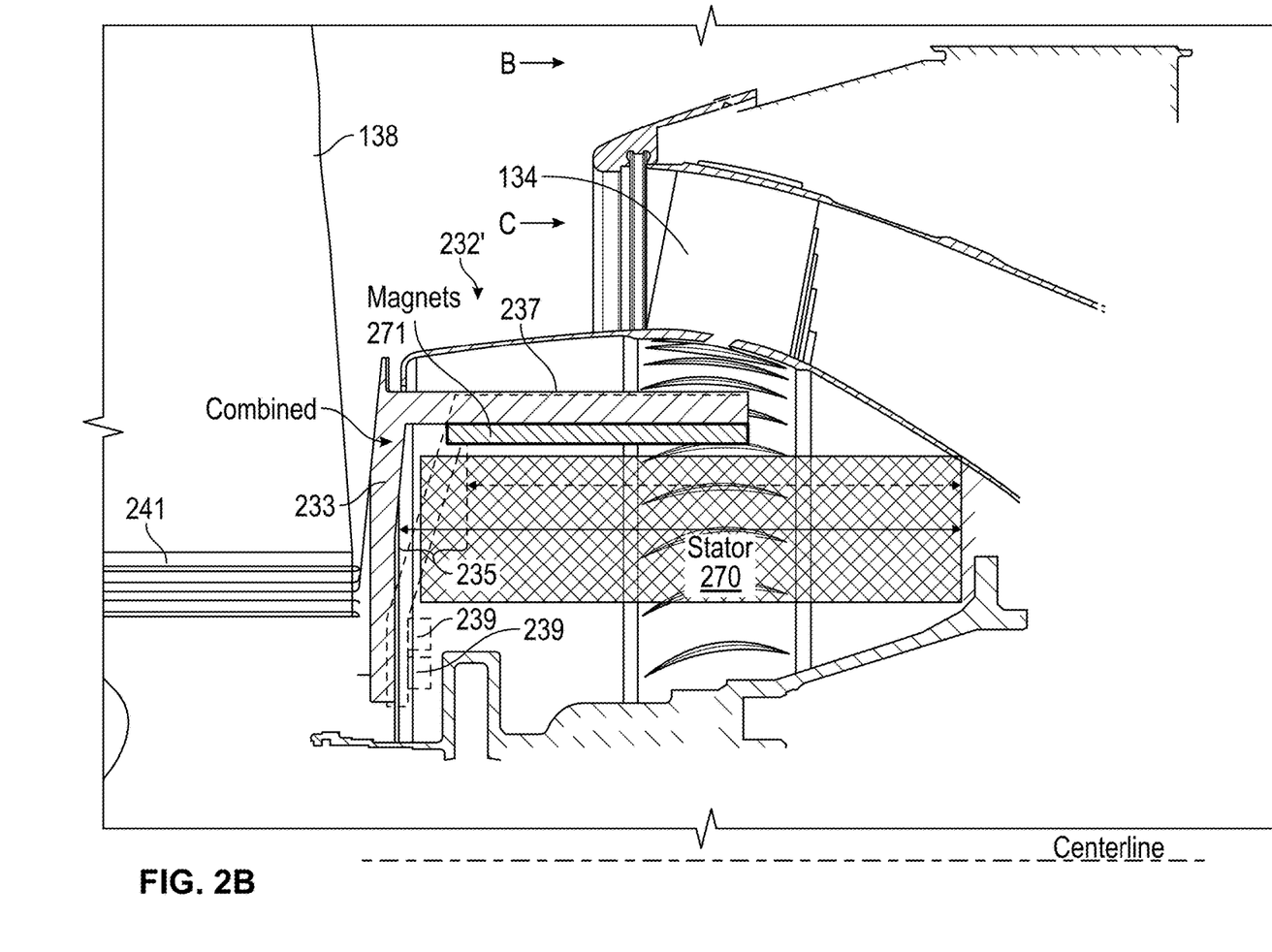

FIGS. 2A and 2B are conceptual diagrams illustrating, in more detail, the electrical generator of FIG. 1 that includes a combined rotor in accordance with various aspects of the techniques described in this disclosure. In the example of FIG. 2A, an electrical generator 232 may include a combined rotor 233 that combines a rotor and a blade retainer, or the rotor, the blade retainer, and a seal. Electrical generator 232 may represent one example of electrical generator 132 in which combined rotor 233 is displaced axially outside of a stator 270 of electrical generator 132. Although combined rotor 233 is displaced axially outside of stator 270 in the example of FIG. 2A, it should be understood that stator 270 may be displaced axially outside of combined rotor 232.

Combined rotor 233 may have a greater length 235 than a separate rotor 237 that is not combined with the blade retainer or the blade retainer and the seal. Separate rotor 237 is shown in dashed-lines as separate rotor 237 is only provided for comparison to combined rotor 233 and is not included within electrical generator 232. The rotor of combined rotor 233 may thereby avoid the slanted rotor armature (required for attaching separate rotor 237 to the blade seal) of the separate rotor 237 that reduces the length of separate rotor 237 by greater length 235.

Manufacturing the combined rotor 233 as a single component (or, in other words, a monolithic component) that incorporates the blade retainer (or blade retainer and seal) may allow the rotor of combined rotor 233 to extend at approximately (e.g., within manufacturing tolerances) 90 degrees relative to the blade retainer (or blade retainer and seal) of combined rotor 233. Combined rotor 233 may be manufactured as a single monolithic component via casting, machining, forging, stamping, sintering, etc., such that there is no fastener (e.g., screw, bolt, and/or other fixture or other type of fastener) coupling the rotor to the blade retainer. That is, rather than fasteners 239 coupling a separate rotor 237 to a separate blade retainer, the single monolithic component used to form combined rotor 233 includes a rotor that is manufactured as a single piece of metal (or other material) that also includes a blade retainer without any intervening fasteners or other fixtures, such as fasteners 239 used to couple separate rotor 237 to the blade retainer.

The blade retainer, as noted above, of combined rotor 233 may retain one or more radially distributed blades 138, which are also secured via blade wheel 239 that rotates in order to generate thrust. Blade wheel 241 may rotate about the longitudinal axis (or "centerline"), rotating blades 138 and combined rotor 233, which may generate power via inductance with stator 270. Blade wheel 241 may be mechanically coupled to the above noted drive shaft in order to rotate blades 138, which may equidistantly radially distributed along blade wheel 241 (although only a single blade 138 is shown in the example of FIG. 2A for ease of illustration purposes).

The rotor of combined rotor 233 may, as shown in the example of FIG. 2A, be displaced at an axially distal end from the longitudinal axis (which may also be referred to as the "centerline") along the axial length of combined rotor 232. In some instances, the rotor of combined rotor 233 may be displace at an axially distal end from the longitudinal axis along the axial length of combined rotor 232 whether the rotor is outside or inside of the stator axially.

As a result of the 90 degree angle between the rotor and blade retainer due to being a single combined component (or, as noted above, a single monolithic component), the rotor may provide a length along the longitudinal axis that is greater than 10% compared to separate rotor 237 that is the separate component from the distinct component for the blade retainer. This additional length may allow for stator 270 of electrical generator 232 (which again is not shown in the example of FIG. 2) to have a corresponding greater length along the longitudinal axis of greater than 10% compared to a stator designed for separate rotor 237.

In this respect, the rotor of combined rotor 232 may be flattened when combined with the blade retainer, which may increase the length along the centerline for stator 270 and increase an axial height of stator 270 (which may also be referred to as stator stack 270), where the increased axial height occurs given that more stators may be stacked in greater length 235 as a result of flattening the rotor armature of separate rotor 237 compared to a stator stack designed for separate rotor 237). Stator 270 may, in addition, be disposed closer to the rotor of combined rotor 233 compared to a stator designed for separate rotor 237. As such, combined rotor 232 may improve electrical performance of electrical generator 232 due to increased length and stator stack size. Furthermore, combined rotor 232 may require fewer components, provide more structural integrity (as fasteners are not required to affix the separate rotor to the blade retainer for combined rotor 232), reduce maintenance costs (as fewer parts results in less maintenance).

Electrical generator 232' shown in the example of FIG. 2B may represent another example of electrical generator 132, and is similar to electrical generator 232 shown in the example of FIG. 2A except that electrical generator 232' includes magnets 271 displaced along the rotor of combined rotor 233. Magnets 271 may represent permanent magnets, which may be formed via rare earth metals (which may produce a strong magnetic field and increase power production for electrical generator 232').

Figure 3:
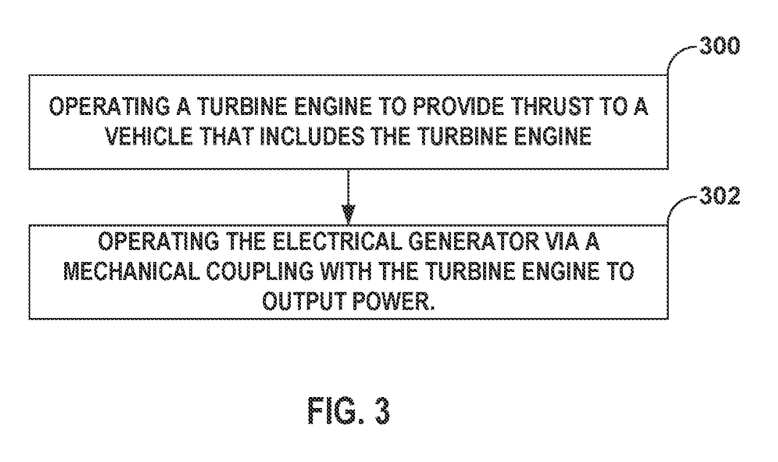
FIG. 3 is a flowchart illustrating example operation of the electrical generator shown in the example of FIG. 1 that includes a combined rotor shown in the example of FIG. 2 in accordance with various aspects of the techniques described in this disclosure.

FIG. 3 is a flowchart illustrating example operation of the electrical generator shown in the example of FIG. 1 that includes a combined rotor shown in the example of FIG. 2 in accordance with various aspects of the techniques described in this disclosure. As discussed above with respect to the example of FIG. 1, turbine engine 100 may include the core section described herein in more detail. The core section may include at least one compressor 114/115 and at least one turbine (e.g., turbines 117, 118, and/or 119) that both rotate about a longitudinal axis 111 of turbine engine 100. Turbine engine 100 may also include fan 113 connected to the core section and configured to be rotated by the at least one turbine 117, 118, and/or 119, rotation of fan 113 providing thrust to the vehicle that includes turbine engine 100 (such as airplane having an airframe). Turbine engine 100 also includes electrical generator 132 integrated into core vane assembly 135 and positioned in the core section aft of fan 113 and fore of the at least one compressor 114/115.

Although not shown in detail in the example of FIG. 1 (but shown in more detail with respect to the example of FIG. 2), electrical generator 132/232 may include a turbine configured to extract work from a core fluid flow, the turbine configured to rotate about longitudinal axis 111. Electrical generator 132/232 may also include a combined rotor 233 mechanically rotated by the turbine of electrical generator 132/232, the combined rotor configured to rotate about longitudinal axis 111 and formed from a single component that incorporates a blade retainer for electrical generator 132/232. Electrical generator 132/232 may also include a stator (which again is not shown in the example of FIG. 2).

A vehicle, such as an airplane, may include controller (such as full authority digital engine control-FADEC) that operates turbine engine 100 to provide thrust to the airplane (and more specifically an airframe of the airplane) that includes turbine engine 100 (300). By operating turbine engine 100, electrical generator 132/232 may operate via a mechanical coupling (e.g., a clutch for optional operation, a direct link for continuous operation, etc.) with turbine engine 100 to output power. In other words, operating turbine engine 100 may operate electrical generator 132/232 via the mechanical coupling with turbine engine 100 to output power (302).

Because electrical generator 132/232 includes combined rotor 233 that incorporates, as a single component, both the rotor and blade retainer (and possible the seal), combined rotor 233 may provide a geometry in which rotor 233 extends at approximately a 90 degree angle from the blade retainer/seal allowing for a larger stator stack and greater active length for both the stator stack and the rotor. This larger stator stack and greater active length for both the stator stack and the rotor, electrical generator 132/232 may produce more power output compared to a separate rotor that limits both the stator stack size axially and longitudinally.

Figure 4:
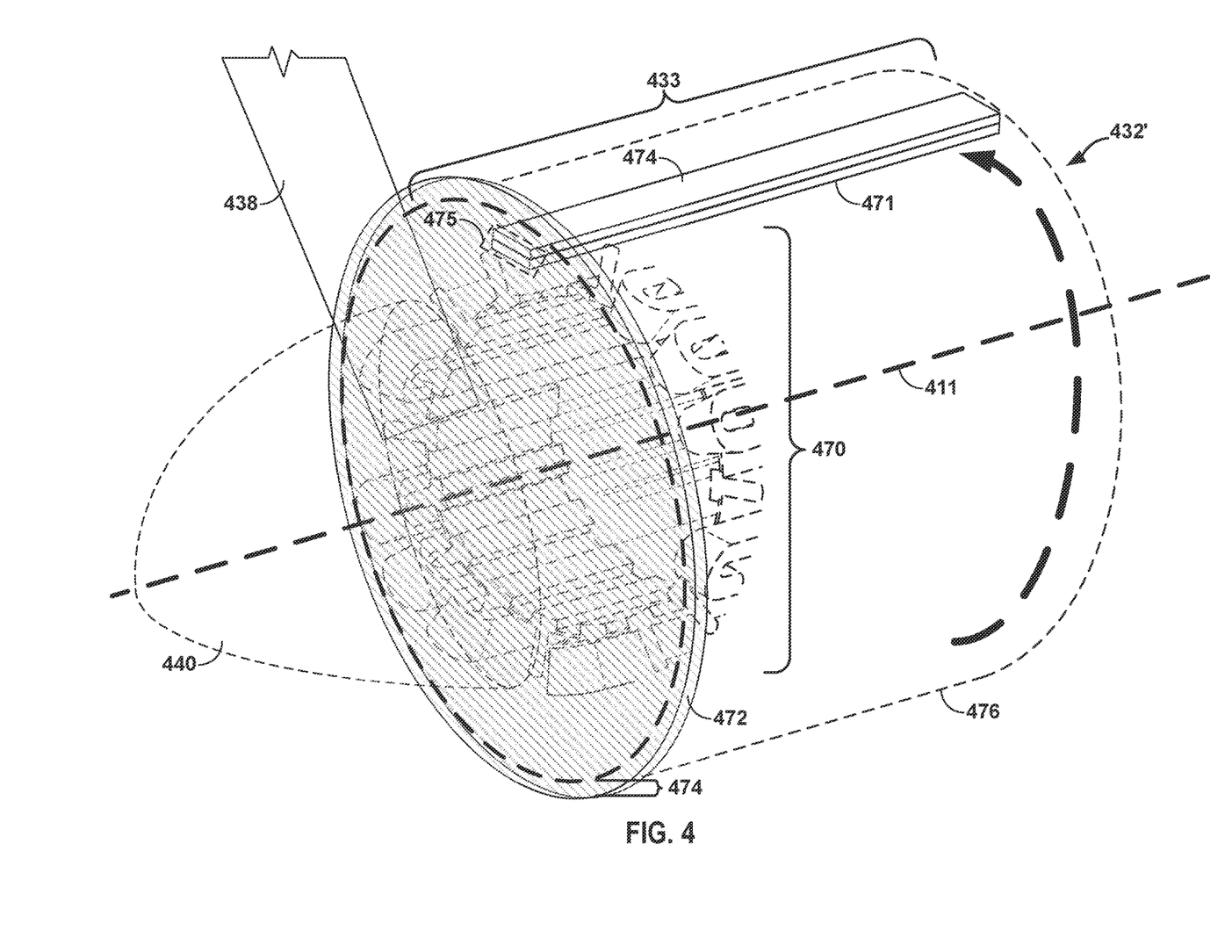
FIG. 4 is a conceptual diagram illustrating, in three dimensions, the electrical generator shown in the example of FIGS. 1-2B that includes a combined rotor in accordance with various aspects of the techniques described in this disclosure.

FIG. 4 is a conceptual diagram illustrating, in three dimensions, the electrical generator shown in the example of FIGS. 1-2B that includes a combined rotor in accordance with various aspects of the techniques described in this disclosure. An electrical generator 432' is shown in the example of FIG. 4, which may represent an example of any of generators 132, 232, and/or 232', but most closely represents electric generator 232' of FIG. 2B given that combined rotor 433 includes permanent magnets 471 similar to electrical generator 232'.

As shown in the example of FIG. 4, combined rotor 433 is disposed between a fan blade 438 (where only a single fan blade 438 is shown for ease of illustration purposes) electrical generator 432' providing an end closure fixture for electrical generator 432'. Combined rotor 433 may be formed from a single piece of metal or other material without any fixtures and/or fasteners (e.g., screws, bolts, clamps, etc.). Combined rotor 433 may represent, in other words, a single monolithic components that includes a blade retainer 472, a seal 474, and a rotor 474 (for electrical generator 432'.

Blade retainer 472 may represent a backend retainer (where backend is defined relative to airflow) for fan blade (s) 438. Blade retainer 472 may retain or otherwise represent a fixture for securing a backend of fan blade(s) 438, where hub 440 may include a frontend blade retainer for retaining a frontend of fan blade(s) 438.

Seal 474 may be formed as a continuous part of blade retainer 472, which extends slightly outside of a housing 476 for electrical generator 432' (where housing 476 may be an internal structure to a turbine engine that extends back into the core of the turbine engine, and electrical engine 432' is displaced forward from the core of the turbine engine as noted above). Seal 474 may represent an integrated component of blade retainer 472 that provides a seal for housing 476 to prevent debris and/or air from entering electrical generator 432'.

Rotor 474 may be integrated with blade retainer 474, where a rotor end 475 extends from blade retainer 472 in approximately a 90 degree angle and is not attached to blade retainer 472 using any form of fixture. Combined blade retainer 433 may be a single piece of metal or other material that is forged, machined, or otherwise manufactured collectively to include one single component to function as blade retainer 472, seal 474, and rotor 474. Rotor 474 may rotate (in this example) counter-clockwise about a centerline 411 (which in the example of turbine engine 120 may extend along a middle line down the center of turbine engine 120. Rotation of rotor 471 about centerline 411 may allow permanent magnets 471 to induce a current within stator(s) 470 (which are shown in part via dotted line in order to facilitate clarity of FIG. 4). Rotor 474 and stator 470 may extend along the length of electrical generator 432', where stator stack (which is another way to refer to stator 470) may be increased in depth and length due to combined rotor 433 as discussed in more detail above and thereby increase electrical power generation compared to separate rotor and blade retainer configurations.

The following numbered examples demonstrate one or more aspects of the disclosure.

Example 1. A turbine engine comprising: a core section comprising at least one compressor and at least one turbine that both rotate about a longitudinal axis of the turbine engine; a fan comprising a plurality of radially distributed blades, the fan connected to the core section and configured to be rotated by the at least one turbine, rotation of the plurality of radially distributed blades providing thrust to a vehicle that includes the turbine engine; and an electrical generator integrated into the core vane assembly and positioned in the core section aft of the fan and fore of the at least one compressor, wherein the electrical generator comprises: a combined rotor rotationally coupled to the fan, the combined rotor configured to rotate about the longitudinal axis and formed from a single component that incorporates a blade retainer for retaining at least one of the plurality of radially distributed blades; and a stator configured to electromagnetically interact with the combined rotor.

Example 2. The turbine engine of example 1, wherein the combined rotor has a greater length along the longitudinal axis when formed from the single component that incorporates the blade retainer compared to a separate rotor that is a separate component from a distinct component for the blade retainer.

Example 3. The turbine engine of any of examples 1 or 2, wherein the stator has a greater length along the longitudinal axis as a result of the combined rotor formed from a single component that incorporates the blade retainer compared to a stator designed for a separate rotor that is a separate component from a distinct component for the blade retainer.

Example 4. The turbine engine of example 3, wherein the stator has the greater length along the longitudinal axis of greater than 10% compared to a stator designed for the separate rotor that is the separate component from the distinct component for the blade retainer.

Example 5. The turbine engine of any of examples 1-4, wherein the single component also incorporates a seal for the electrical generator.

Example 6. The turbine engine of any of examples 1-5, wherein the single component includes a 90 degree angle between the combined rotor and the blade retainer.

Example 7. The turbine engine of any of examples 1-6, wherein the single component displaces the combined rotor at an axially distal end from the longitudinal axis along the axial length of the single component.

Example 8. The turbine engine of any of examples 1-7, wherein the stator is displaced axially outside of the combined rotor within the electrical generator.

Example 9. The turbine engine of any of examples 1-8, wherein the combined rotor is displaced axially outside of the stator within the electrical generator.

Example 10. The turbine engine of any of examples 1-9, wherein the turbine engine provides the thrust to an airframe.

Example 11. A method comprising: operating a turbine engine to provide thrust to a vehicle that includes the turbine engine, wherein the turbine engine comprises: a core section comprising at least one compressor and at least one turbine that both rotate about a longitudinal axis of the turbine engine; a fan comprising a plurality of radially distributed blades, the fan connected to the core section and configured to be rotated by the at least one turbine, rotation of the plurality of radially distributed blades providing the thrust to the vehicle that includes the turbine engine; and an electrical generator positioned in the core section aft of the fan and fore of the at least one compressor, wherein the electrical generator comprises: a combined rotor mechanically rotated via a mechanical connection to the at least one turbine, the combined rotor configured to rotate about the longitudinal axis and formed from a single component that incorporates a blade retainer for retaining at least one of the plurality of radially distributed blades; and a stator configured to electromagnetically interact with the combined rotor; and operating the electrical generator via the mechanical connection to the turbine engine to output power.

Example 12. The method of example 11, wherein the combined rotor has a greater length along the longitudinal axis when formed from the single component that incorporates the blade retainer compared to a separate rotor that is a separate component from a distinct component for the blade retainer.

Example 13. The method of any of examples 11 or 12, wherein the stator has a greater length along the longitudinal axis as a result of the combined rotor formed from a single component that incorporates the blade retainer compared to a stator designed for a separate rotor that is a separate component from a distinct component for the blade retainer.

Example 14. The method of example 13, wherein the stator has the greater length along the longitudinal axis of greater than 10% compared to a stator designed for the separate rotor that is the separate component from the distinct component for the blade retainer.

Example 15. The method of any of examples 11-14, wherein the single component also incorporates a seal for the electrical generator.

Example 16. The method of any of examples 11-15, wherein the single component includes a 90 degree angle between the combined rotor and the blade retainer.

Example 17. The method of any of examples 11-16, wherein the single component displaces the combined rotor at an axially distal end from the longitudinal axis along the axial length of the single component.

Example 18. The method of any of examples 11-17, wherein the stator is displaced axially outside of the combined rotor within the electrical generator.

Example 19. The method of any of examples 11-18, wherein the combined rotor is displaced axially outside of the stator within the electrical generator.

Example 20. An aircraft comprising: an airframe; and a turbine engine comprising: a core section comprising at least one compressor and at least one turbine that both rotate about a longitudinal axis of the turbine engine; a fan comprising a plurality of radially distributed blades, the fan connected to the core section and configured to be rotated by the at least one turbine, rotation of the plurality of radially distributed blades providing thrust to the airframe; and an electrical generator integrated into the core vane assembly and positioned in the core section aft of the fan and fore of the at least one compressor, wherein the electrical generator comprises: a combined rotor rotationally coupled to the fan, the combined rotor configured to rotate about the longitudinal axis and formed from a single component that incorporates a blade retainer for retaining at least one of the plurality of radially distributed blades; and a stator configured to electromagnetically interact with the combined rotor.

Various examples have been described. These and other examples are within the scope of the following claims.

What is claimed is:

1. A turbine engine comprising:
   a core section comprising at least one compressor and at least one turbine, the at least one compressor and the at least one turbine both rotate about a longitudinal axis of the turbine engine, wherein the at least one compressor comprises an intermediate pressure compressor and a high pressure compressor;
   a fan comprising a plurality of radially distributed blades, the fan connected to the core section and configured to be rotated by the at least one turbine, rotation of the plurality of radially distributed blades providing thrust to a vehicle that includes the turbine engine; and
   an electrical generator integrated into a core vane assembly, wherein at least a portion of the electrical generator is positioned in the core section aft of the fan and fore of an entirety of the intermediate pressure compressor and an entirety of the high pressure compressor, and wherein the electrical generator comprises:
   a combined rotor rotationally coupled to the fan, the combined rotor configured to rotate about the longitudinal axis and formed from a single component that incorporates a blade retainer for retaining at least one of the plurality of radially distributed blades;
   a stator configured to electromagnetically interact with the combined rotor,
   wherein a portion of the single component is displaced axially outside of the stator within the electrical generator such that the portion of the single component is radially external to the stator at a same location along the longitudinal axis.

2. The turbine engine of claim 1, wherein the combined rotor has a greater length along the longitudinal axis when formed from the single component that incorporates the blade retainer compared to a separate rotor that is a separate component from a distinct component for the blade retainer.

3. The turbine engine of claim 1, wherein the stator has a greater length along the longitudinal axis as a result of the combined rotor formed from the single component that incorporates the blade retainer compared to a stator designed for a separate rotor that is a separate component from a distinct component for the blade retainer.

4. The turbine engine of claim 3, wherein the stator has the greater length along the longitudinal axis of greater than 10% compared to a stator designed for the separate rotor that is the separate component from the distinct component for the blade retainer.

5. The turbine engine of claim 1, wherein the single component also incorporates a seal for the electrical generator.

6. The turbine engine of claim 1, wherein the single component includes a 90 degree angle between the combined rotor and the blade retainer.

7. The turbine engine of claim 1, wherein the single component displaces the combined rotor at an axially distal end from the longitudinal axis along an axial length of the single component.

8. The turbine engine of claim 1, wherein the turbine engine provides the thrust to an airframe.

9. A method comprising:
   operating a turbine engine to provide thrust to a vehicle that includes the turbine engine, wherein the turbine engine comprises:
   a core section comprising at least one compressor and at least one turbine, the at least one compressor and the at least one turbine both rotate about a longitudinal axis of the turbine engine, wherein the at least one compressor comprises an intermediate pressure compressor and a high pressure compressor;
   a fan comprising a plurality of radially distributed blades, the fan connected to the core section and configured to be rotated by the at least one turbine, rotation of the plurality of radially distributed blades providing the thrust to the vehicle that includes the turbine engine; and
   an electrical generator positioned in the core section aft of the fan, wherein at least a portion of the electrical generator is positioned fore of an entirety of the intermediate pressure compressor and an entirety of the high pressure compressor, and wherein the electrical generator comprises:
   a combined rotor mechanically rotated via a mechanical connection to the at least one turbine, the combined rotor configured to rotate about the longitudinal axis and formed from a single component that incorporates a blade retainer for retaining at least one of the plurality of radially distributed blades; and
   a stator configured to electromagnetically interact with the combined rotor;
   operating the electrical generator via the mechanical connection to the turbine engine to output power,
   wherein a portion of the single component is displaced axially outside of the stator within the electrical generator such that the portion of the single component is radially external to the stator at a same location along the longitudinal axis.

10. The method of claim 9, wherein the combined rotor has a greater length along the longitudinal axis when formed from the single component that incorporates the blade retainer compared to a separate rotor that is a separate component from a distinct component for the blade retainer.

11. The method of claim 9, wherein the stator has a greater length along the longitudinal axis as a result of the combined rotor formed from the single component that incorporates the blade retainer compared to a stator designed for a separate rotor that is a separate component from a distinct component for the blade retainer.

12. The method of claim 11, wherein the stator has the greater length along the longitudinal axis of greater than 10% compared to a stator designed for the separate rotor that is the separate component from the distinct component for the blade retainer.

13. The method of claim 9, wherein the single component also incorporates a seal for the electrical generator.

14. The method of claim 9, wherein the single component includes a 90 degree angle between the combined rotor and the blade retainer.

15. The method of claim 9, wherein the single component displaces the combined rotor at an axially distal end from the longitudinal axis along an axial length of the single component.

16. An aircraft comprising:
    an airframe; and
    a turbine engine comprising:
    a core section comprising at least one compressor and at least one turbine, the at least one compressor and the at least one turbine both rotate about a longitudinal axis of the turbine engine, wherein the at least one compressor comprises an intermediate pressure compressor and a high pressure compressor;
    a fan comprising a plurality of radially distributed blades, the fan connected to the core section and configured to be rotated by the at least one turbine, rotation of the plurality of radially distributed blades providing thrust to the airframe; and
    an electrical generator integrated into a core vane assembly, wherein at least a portion of the electrical generator is positioned in the core section aft of the fan and fore of an entirety of the intermediate pressure compressor and an entirety of the high pressure compressor, and wherein the electrical generator comprises:
      a combined rotor rotationally coupled to the fan, the combined rotor configured to rotate about the longitudinal axis and formed from a single component that incorporates a blade retainer for retaining at least one of the plurality of radially distributed blades;
      a stator configured to electromagnetically interact with the combined rotor,
    wherein a portion of the single component is displaced axially outside of the stator within the electrical generator such that the portion of the single component is radially external to the stator at a same location along the longitudinal axis.

* * * * *